March 30, 1965  D. E. NEWELL ETAL  3,176,244
TEMPERATURE COMPENSATION OF QUARTZ CRYSTAL
BY NETWORK SYNTHESIS MEANS
Filed April 20, 1961  3 Sheets-Sheet 1
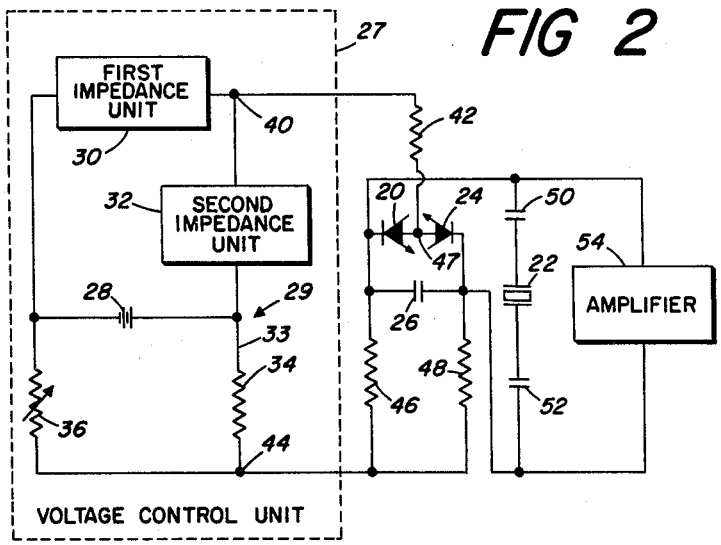
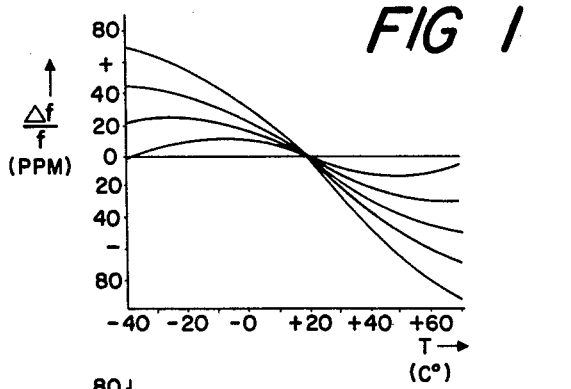
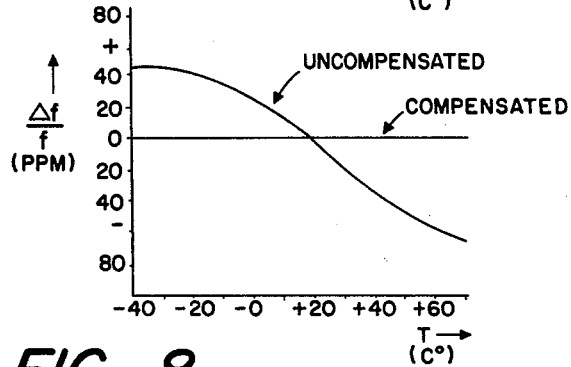
INVENTORS
DARRELL E. NEWELL
NORBERT R. MALIK
BY
Moody and Harris
ATTORNEYS

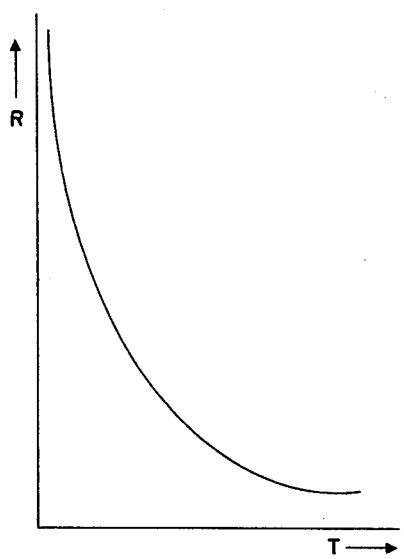
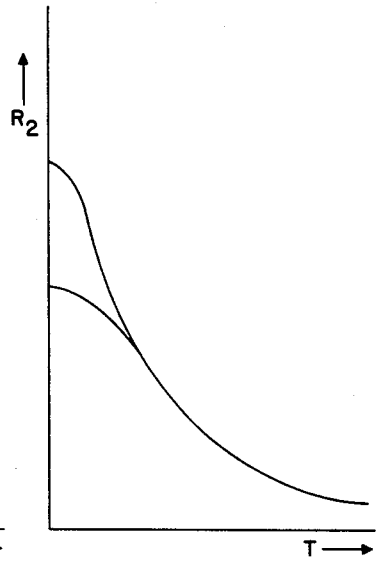
FIG 3  FIG 4
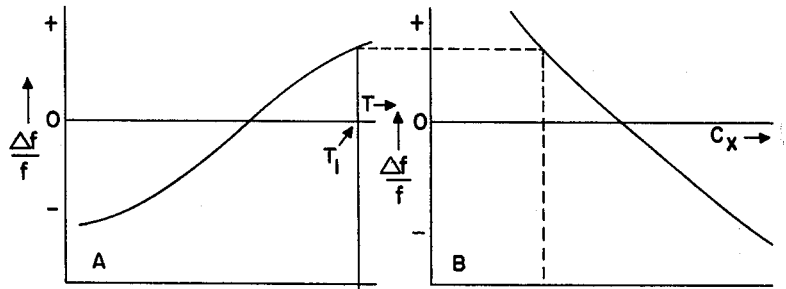
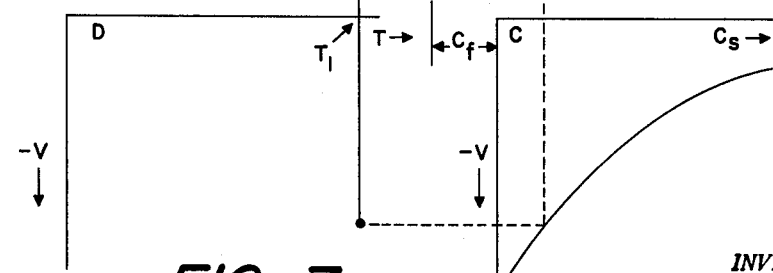
FIG 7
INVENTORS
DARRELL E. NEWELL
NORBERT R. MALIK
BY
Moody and Harris
ATTORNEYS March 30, 1965  D. E. NEWELL ETAL  3,176,244
TEMPERATURE COMPENSATION OF QUARTZ CRYSTAL
BY NETWORK SYNTHESIS MEANS
Filed April 20, 1961  3 Sheets-Sheet 3

INVENTORS
DARRELL E. NEWELL
NORBERT R. MALIK
BY
*Moody and Harris*
ATTORNEYS

United States Patent Office 3,176,244
Patented Mar. 30, 1965

3,176,244
TEMPERATURE COMPENSATION OF QUARTZ
CRYSTAL BY NETWORK SYNTHESIS MEANS
Darrell Edwin Newell, Iowa City, and Norbert R. Malik,
Ames, Iowa, assignors to Collins Radio Company,
Cedar Rapids, Iowa, a corporation of Iowa
Filed Apr. 20, 1961, Ser. No. 104,330
1 Claim. (Cl. 331—116)

This invention relates to a frequency stabilizing network and more particularly to a network for substantially eliminating frequency drift due to temperature variations over an extended range.

One of the more perplexing problems in the electronics industry is in the area of frequency stability. In years past frequency stability was not nearly as important as it is today and, from all indications, as it will be in the future. For example, in the communications field, frequency tolerances in the past have sometimes required an accuracy of only 10 parts per million or less. Today, however, it is frequently necessary that this accuracy be reduced to 1 or even to 0.1 part per million.

While the components of frequency determining means for an oscillator are chosen so that the oscillator resonates at a predetermined frequency, ambient temperature variations can and do affect the oscillator to cause frequency drift or variation. When an uncompensated quartz crystal, for example, is used as the frequency determining means, the frequency may vary from 10 parts per million to 100+ parts per million over a given temperature range depending upon the angle of the cut of the crystal. It is therefore readily apparent that frequency stability with the accuracy mentioned hereinabove can only be achieved with a highly accurate compensation network.

One expedient for eliminating frequency drift due to temperature change is to eliminate the temperature change itself. This may be done by isolating the oscillator or, at least the frequency determining means, which is frequently a crystal, and then maintaining this isolated portion at a constant temperature by means of an oven. It will be readily appreciated, however, that such an oven must necessarily be bulky and its use would therefore frequently be undesirable, particularly in mobile equipment which must be as lightweight and compact as possible.

It has also been suggested heretofore that a compensating circuit might be utilized wherein the ambient temperature variations themselves are not eliminated, but are merely compensated to minimize their effect. Heretofore known compensating networks of this type, however, have failed to provide a compensating network capable of maintaining a frequency stability within very stringent requirements to virtually eliminate drift due to ambient temperature variations.

In addition, although some frequency stabilizing networks have included thermistors, these devices have commonly been used in the loading circuit of the crystal causing de-Qing of the crystal and thereby undesirably making selectivity a function of temperature.

It is therefore an object of this invention to provide an improved frequency stabilizing network capable of virtually eliminating frequency drift due to ambient temperature variations over an extended range.

More particularly, it is an object of this invention to provide a highly accurate frequency stabilizing network capable of virtually eliminating frequency drift due to ambient temperature changes over at least a temperature range of −40° centigrade to +70° centigrade.

It is also an object of this invention to provide a frequency stabilizing network having a bridge circuit including a plurality of impedance units at least one of which includes a thermistor to supply a variable direct voltage and a reference voltage to control the resonant frequency of said frequency determining means and thereby substantially eliminate frequency variations due to ambient temperature changes.

It is another object of this invention to provide a network for stabilizing the output frequency of a crystal oscillator by varying the load capacitance on said crystal, said network including a pair of oppositely poled voltage variable capacitors biased by a first D.C. circuit having temperature sensitive elements and a second D.C. circuit supplying a reference voltage.

With these and other objects in view, which will become apparent to one skilled in the art as the description proceeds, this invention resides in the novel construction, combination and arrangement of parts substantially as hereinafter described and more particularly defined by the appended claim, it being understood that such changes in the precise embodiments of the herein disclosed invention may be submitted as come within the scope of the claim.

The accompanying drawings illustrate several examples of the embodiments of the invention constructed according to the best mode so far devised for the practical application of the principles thereof, and in which:

FIGURE 1 is a typical graphical plot of the frequency deviations of uncompensated crystals due to temperature variations;

FIGURE 2 is one embodiment of a compensating network constructed in accordance with the teachings of this invention;

FIGURE 3 illustrates by typical graphical plot the manner in which the resistance of a thermistor varies with respect to temperature variations;

FIGURE 4 illustrates by typical graphical plot the manner in which the resistance of a thermistor may be changed with respect to temperature by adding resistors in parallel;

FIGURE 7 illustrates a graphical method of determining the voltage needed for compensation; and FIGURE 8 is a graphical plot of a theoretically perfect crystal both uncompensated and compensated.

Figures 5A, 5B:
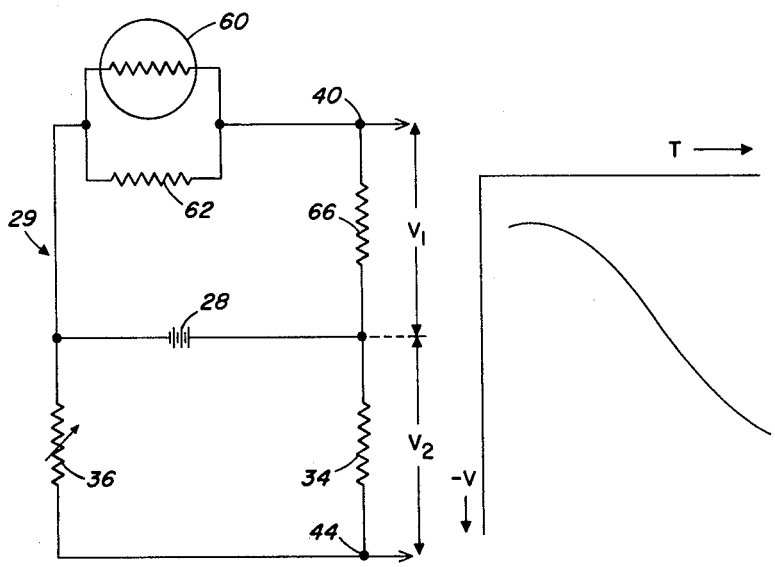
FIGURE 5A is a schematic presentation of one embodiment of the control circuit of this invention as shown in FIGURE 2.
FIGURE 5B is a graphical plot of control circuit output voltage with respect to temperature for the circuit of FIGURE 5A.

The frequency of an oscillator is determined by a resonator of some type. In the case of an LC network, for example, either the inductor or the capacitor can be tunable to thereby vary the resonant frequency of the oscillator. In like manner, a crystal may be loaded, usually by capacitive loading, to change its resonant frequency. It will therefore be appreciated that while crystal compensation is discussed hereinafter, the teachings of this invention, while particularly well suited for compensating a crystal, are not meant to be limited thereto.

As noted hereinabove, the quartz crystal is highly sensitive to temperature change. As shown typically in FIGURE 1, over a temperature range of −40° centigrade to +70° centigrade, such a crystal may exhibit frequency variations in the form of an S shaped curve.

This variation of crystal frequency with temperature may be expressed by the following equation:

$$\frac{\Delta f}{f} = a(T_1 - T) + b(T_1 - T)^2 + c(T_1 - T)^3 \quad (1)$$

where $a$, $b$, and $c$ are coefficients which depend upon the angle of cut of the crystal, $T_1$ is the particular temperature of interest, $T$ is a reference temperature, and $f$ is the crystal frequency at temperature $T$. However, since the value of $b(T_1-T)^2$ is negligible, the equation may be considered as:

$$\frac{\Delta f}{f} = a(T_1 - T) + c(T_1 - T)^3 \quad (2)$$

As noted hereinabove the resonant frequency of a crystal may be varied by varying the load capacitance thereon. In other words, a crystal having a variable capacitor connected as a load will resonate at a frequency dependent upon the total load capacitance ($C_x$). The equation which relates frequency to load capacitance may be expressed as follows:

$$\frac{\Delta f}{f} = -M + \frac{C_p \times 10^6}{2r(C_p + C_x)} \quad (3)$$

where M is a constant determined by the value of load capacitance ($C_x$) desired at some frequency $f$, $C_p$ is the parallel capacitance of the crystal, and $r$ is the ratio of series to parallel crystal capacitance.

Thus if the load capacitance is always changed in a manner to just neutralize the temperature induced frequency change the net result will be frequency stabilization or, in other words, elimination of frequency drift over the entire temperature range. This is to say that if Equations 2 and 3 are added and the sum set equal to zero thusly:

$$a(T_1 - T) + c(T_1 - T)^3 - M + \frac{C_p \times 10^6}{2r(C_p + C_x)} = 0 \quad (4)$$

then, utilizing this equation, it is possible to find the value of load capacitance needed to hold the crystal at any constant predetermined frequency.

It would, of course, be impossible to physically vary the capacitive load each time there is an ambient temperature change. It was therefore necessary to find automatic means to sense the ambient temperature and thereby automatically vary the load capacitance ($C_x$) just enough to offset the temperature induced frequency drift.

A frequency stabilization network for compensating a crystal is shown in FIGURE 2. As shown, a junction diode 20, which is also referred to as a voltage variable capacitor, is connected in the load circuit of crystal 22. As is known in the art, the capacitance of such a voltage sensitive element may be varied by the application of a biasing direct voltage according to the following equation:

$$C = \frac{K}{V^a} \quad (5)$$

where C is the capacitance, K and $a$ are constants, and V is the direct voltage for control.

By providing a second junction diode 24, in series with the first and oppositely poled with respect thereto, and a fixed capacitor 26 in shunt with both junction diodes, the A.C. signal may be prevented from self-biasing the diodes. The net capacitance from the junction diodes ($C_s$) may be expressed as:

$$C_s = \frac{C}{2} \quad (6)$$

The total load capacitance ($C_x$) seen by the crystal would therefore be:

$$C_x = C_f + C_s \quad (7)$$

where $C_f$ is the capacitance of the fixed capacitor.

In designing the compensating circuit a suitable junction diode constant (K) had to be chosen. By differentiating Equations 3, 5, 6 and 7, and using the relationship:

$$\frac{dV}{dC} \times \frac{dC}{dC_s} \times \frac{dC_s}{dC_x} \times \frac{dC_x}{d\frac{\Delta f}{f}} = \frac{dV}{d\frac{\Delta f}{f}} \quad (8)$$

the following equation may be found:

$$K_1 \frac{K^2(C_p + C_f + C_s)^2}{C_s^3} = \frac{dV}{d\frac{\Delta f}{f}} \quad (9)$$

where $K_1$ is a constant.

Equation 9 shows that at any temperature [which, of course, has a particular value of diode capacitance ($C_s$)] the permissible matching error in voltage ($dV$) for a given error in frequency $$d\frac{\Delta f}{f}$$

will be greatest when K is as large as possible. Since the output of the control voltage circuit must be matched to the required curve by successive approximation, a large value for Equation 9 is desirable at each temperature. It has been found that Hughes silicon capacitor HC7004, which gives a K value of 132, is suitable for an ordinary 32 $\mu\mu$fd. crystal.

By choosing a small value for the shunting fixed capacitor 26, the operation of the junction diodes 20 and 24 will be centered at the low voltage end which has also been found to be desirable. However, the fixed capacitor 26 must not be made too small because then the A.C. voltage might forward bias the diodes and result in a distorted voltage temperature curve. It has been found that the value of fixed capacitor 26 should be such that the minimum bias control voltage required is between —4 and —6 volts.

Junction diodes 20 and 24 must, of course, be supplied with a biasing direct voltage which automatically is caused to vary to exactly compensate for temperature induced frequency drift. As shown in FIGURE 2, such a circuit may be provided by voltage control unit 27 having a regulated direct source of voltage 28 connected to bridge circuit 29 which has a combination of impedance units 30 and 32, which may include resistors and thermistors as necessary, and a reference branch 33 having a fixed resistor 34 and a variable resistor 36.

As shown in FIGURE 2, the voltage supplied to junction diodes 20 and 24 may be coupled from between the two impedance units, as at 40, through an isolation resistor 42 to the anodes of each junction diode, while the cathodes of the junction diodes may have the reference voltage applied thereto by coupling a voltage from the reference branch, as at 44, through resistors 46 and 48. To isolate the D.C. circuit from the crystal to be compensated, the crystal may be connected to junction diodes 20 and 24 through a pair of capacitors 50 and 52. If desired, amplifier 54, which may be conventional and, of course, is a necessary part of the oscillator, may also be connected to the crystal through capacitors 50 and 52.

As shown in FIGURE 3, a thermistor, which is a mass of resistive material having a high negative temperature coefficient of resistivity, decreases in resistance with an increase in temperature. However, by combining one or more thermistors with one or more resistors, the resulting impedance of the unit or network will vary in a different manner with temperature than did the thermistor alone. The curve depends not only on whether the resistor is shunted or is in series, but also on the particular components. As shown in FIGURE 5, for example, the curve is altered considerably merely by changing the value of a resistor connected in shunt with the thermistor.

As shown by Equation 4, the compensating circuit must provide a frequency curve that is the reciprocal of the frequency drift of the uncompensated crystal with respect to ambient temperature variations. This means, of course, that the direct voltage supplied to bias the junction diodes must be caused to vary in a predetermined exact manner for perfect compensation.

Figures 6A, 6B:
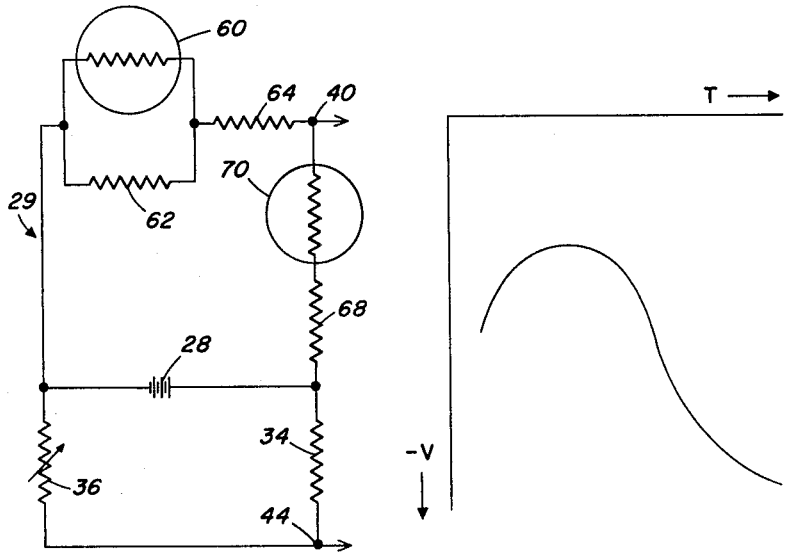
FIGURE 6A is a schematic presentation of a second embodiment of the control circuit of this invention as shown in FIGURE 2.
FIGURE 6B is a graphical plot of control circuit output voltage with respect to temperature for the circuit of FIGURE 6A.

Such a compensating control circuit, for example, may take the form, as shown in FIGURE 5A, wherein a single thermistor is utilized, or by the circuit as shown by FIGURE 6A where two thermistors are utilized to provide a bias voltage as shown in FIGURES 5B and 6B. As the required compensating bias voltage curve gets more complex than as shown in FIGURES 5B and 6B, additional thermistors and/or resistors, or even additional impedance units may be added as required for compensation to the degree of accuracy desired.

In determining the exact circuit structure for the control circuit in each case, the number of impedance units, as well as the number of thermistors and resistors to be used therein must first be determined, after which the particular values needed can then be ascertained. The number and combination of thermistors and resistors can be determined empirically, by a graphical method, or by calculations for each temperature.

In calculating the required voltage, Equation 4 may be utilized to find an equation for total load capacitance ($C_x$) which varies with temperature, as follows:

$$C_x = -C_p + \frac{\frac{C_p}{2r} \times 10^6}{M - aT_2 - cT_2^3} \qquad (10)$$

where $T_2 = T_1 - T$.

Then assuming that the diodes 20 and 24 and fixed capacitor 26 are in the circuit, Equations 5, 6 and 7 may be utilized to find the following control voltage formula (wherein V is raised to the "$a$" power):

$$V^a = \frac{-K}{2(C_p + C_f)} \times \frac{T_2^3 + \frac{a}{c}T_2 - \frac{M}{c}}{T_2^3 + \frac{a}{c}T_2 + \left[\frac{C_p \times 10^6}{2rc(C_p + C_f)} - \frac{M}{C}\right]} \qquad (11)$$

By graph, the control voltage may be found as shown in FIGURE 7. The inverse curve of the crystal, that is, the inverse of the frequency deviation due to temperature of the crystal, must first be plotted as shown in typical form in plot A of FIGURE 7. The curve of the crystal may be found by using theoretical crystal Equation 1 or, more preferably by actual measurement. To find the proper load capacitance for each temperature, Equation 3 must then be plotted with its frequency axis parallel to and aligned with that of the first curve as shown by plot B of FIGURE 7. Below the last drawn curve a capacitance voltage curve with respect to voltage is plotted (plot C of FIGURE 7). This is found by substituting Equation 6 into Equation 5. This curve, however, must be plotted so that the capacitance axis is parallel to the capacitance axis of plot B.

The axes of plots B and C are not aligned with corresponding values of capacitance opposite one another since the capacitance scale of plot B is marked in terms of total capacitance load while the scale of plot C is in terms of the junction diode capacitance. This last curve must therefore be plotted so that each value of $C_s$ lies opposite $C_x - C_f$ on plot B as shown in FIGURE 7. A fourth curve must then be drawn (on plot D) with the voltage axis parallel to the voltage axis of plot C as also shown in FIGURE 7.

In order to find the voltage temperature characteristic which must be produced by the control voltage circuit it is only necessary to project values from curve to curve as shown in dotted lines in FIGURE 8. For example, starting at some temperature $T_1$ on plot A, the frequency change necessary for compensation can be found and projected to plot B. The intersection point is the total load capacitance that the crystal must see to be on frequency. If this point is then projected down to plot C, the proper control voltage will be found. Projecting from this curve to the voltage temperature plot D gives one point of the required curve as shown in FIGURE 7. This process is then repeated for a number of values of temperature and the voltage characteristic required for perfect compensation can then be found by joining the points to form a smooth curve.

After determining the voltages needed for each temperature, selection of impedance units may be made so that the values of the particular components will provide the necessary voltage at each temperature, and will necessarily depend upon the complexity of the curve to be matched, i.e., its deviation from linearity over the temperature range.

After selection of the elements of each impedance unit has been made, the exact voltages required for each impedance unit must be determined. Impedance unit 30 might, for example, comprise a thermistor 60 in parallel with a resistor 62 (as shown in FIGURE 5A) or a thermistor 60 in parallel with resistor 62 and in series with a resistor 64 (as shown in FIGURE 6A), while impedance unit 32 might comprise a single resistor 66 (as shown in FIGURE 5A), or a resistor 68 in series with a thermistor 70 (as shown in FIGURE 6A). Assuming, for illustration, that the components shown in FIGURE 5A have been selected, the values of the components may be found by the following formula:

$$V_1 = \frac{R_{66} \times E_{28}}{R_{66} + R_z} \qquad (12)$$

where $V_1$ is the voltage coupled from junction 40, and $R_z$ is the impedance of unit 30 determined by the following:

$$\frac{R_{60} \times R_{62}}{R_{60} + R_{62}} \qquad (13)$$

where $R_{60}$ is the resistance of the thermistor at a particular temperature. Values may then be assigned, one at a time, to the various components until a suitable arrangement is achieved.

It was found desirable to initially choose a rather large thermistor value and choose a rather small value for resistor 62. Then by choosing resistor 66 so that $$\frac{V_1}{E}$$

equals about 0.25 at $-40°$ centigrade, E may be chosen so that its peak to peak voltage change equals the peak to peak change in the required curve.

The reference voltage ($V_2$ as shown in FIGURE 5A) may then be used to make the curves coincident at top and bottom. The values of the components may, of course, thereafter be changed until the exact curve is established.

The circuit as shown in FIGURE 5A may be used along with the circuitry of FIGURE 2 as a compensating circuit for a theoretically perfect quartz crystal with an AT cut 35°25'. For perfect compensation of such a crystal, the following values and/or components might be used:

Themistor 80—Glennite 45CA2;
Resistor 82—400K ohms;
Resistor 84—25K ohms;
Direct voltage power supply 28—17.12 volts;
Reference voltage (from point 44)—4.8 volts;
Junction diodes 20 and 24—Hughes HC7004; and
Fixed capacitor 26—9.25 µµfd.

Such a crystal would have an uncompensated frequency drift over the frequency range of $-40°$ centigrade to $+70°$ centigrade as shown by FIGURE 8, and would be automatically compensated (as shown by the straight line plot of FIGURE 8) by the network described hereinabove. In practice, of course, the crystal is not perfect and the impedance units must be varied accordingly.

It is to be realized, of course, that the compensating network of this invention, although particularly well suited for compensation of a crystal, may also be utilized for compensation of other ambient temperature sensitive frequency determining means such as, for example, an L-C type resonator.

It should be evident from the foregoing that the frequency stabilizing network of this invention provides an improved compensation means whereby frequency drift due to ambient temperature variations can be virtually eliminated over a broad range extending at least from −40° C. to +70° C.

What is claimed as our invention is:

A frequency stabilizing network for highly accurate compensation of oscillator output frequency drift due to ambient temperature variations over a range at least from −40° C. to +70° C., said network comprising: an oscillater the output frequency of which deviates due to temperature variations, the resonant frequency of said oscillator being determined by a crystal; a capacitive load shunting said crystal, said load including a pair of junction diodes having their anodes connected in common and a capacitor connected between the cathodes of said diodes said crystal having first and second terminal connected respectively to the cathodes of said diodes; a source of direct voltage; a bridge circuit having first, second, third and fourth impedance units with said first and second units connected serially across said D.C. source and said third and fourth units connected serially across said D.C. source, the positive terminal of said D.C. source being connected to the junction between said second and fourth units; said first and second impedance units including at least one thermistor; first and second D.C. return resistors respectively connecting the cathodes of said junction diodes to the junction between said third and fourth impedance units; and an isolation resistor connecting the cathodes of said junction diode to the junction between said first and second impedance units.

References Cited by the Examiner
UNITED STATES PATENTS

| | | | |
|---|---|---|---|
| 2,811,647 | 10/57 | Nilssen | 331—36 |
| 3,020,493 | 2/62 | Carroll | 332—30 |
| 3,021,492 | 2/62 | Kaufman | 331—117 |
| 3,054,966 | 9/62 | Etherington | 331—116 |

FOREIGN PATENTS

| | | |
|---|---|---|
| 1,084,780 | 7/60 | Germany. |

ROY LAKE, *Primary Examiner.*

JOHN KOMINSKI, *Examiner.*